United States Patent
Di Chiara et al.

(10) Patent No.: US 10,070,335 B2
(45) Date of Patent: Sep. 4, 2018

(54) TRACING INTER-RAT EVENTS

(71) Applicant: NOKIA SOLUTIONS AND NETWORKS OY, Espoo (FI)

(72) Inventors: Bernardo Di Chiara, Espoo (FI); Gyula Bodog, Budapest (HU); Mika Juhani Nevander, Vantaa (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 14/759,055

(22) PCT Filed: Jan. 4, 2013

(86) PCT No.: PCT/EP2013/050116
§ 371 (c)(1),
(2) Date: Jul. 2, 2015

(87) PCT Pub. No.: WO2014/106544
PCT Pub. Date: Jul. 10, 2014

(65) Prior Publication Data
US 2015/0334645 A1 Nov. 19, 2015

(51) Int. Cl.
*H04W 4/00* (2018.01)
*H04W 24/10* (2009.01)
*H04W 48/18* (2009.01)
*H04W 24/08* (2009.01)

(52) U.S. Cl.
CPC ........... *H04W 24/10* (2013.01); *H04W 48/18* (2013.01); *H04W 24/08* (2013.01)

(58) Field of Classification Search
CPC .............................. H04W 24/10; H04W 48/18
USPC ...................................... 455/422.1, 423, 436
See application file for complete search history.

(56) References Cited

U.S. PATENT DOCUMENTS

| | | | | |
|---|---|---|---|---|
| 2011/0319115 | A1* | 12/2011 | Racz | H04W 24/10 455/514 |
| 2012/0315949 | A1* | 12/2012 | Zhang | H04W 24/08 455/525 |
| 2014/0228016 | A1* | 8/2014 | Futaki | H04W 36/0055 455/422.1 |

FOREIGN PATENT DOCUMENTS

WO      WO 2013/001333 A1      1/2013

OTHER PUBLICATIONS

European Office Action application No. 13 700 131.9 dated Jun. 29, 2016.

(Continued)

*Primary Examiner* — Chuck Huynh
(74) *Attorney, Agent, or Firm* — Squire Patton Boggs (US) LLP

(57) ABSTRACT

It is provided an apparatus, comprising selecting means adapted to select one set of parameters/values out of a first set of parameters/values and a second set of parameters/values received in an activation message related to a trace session of a subscriber or a terminal, wherein the selected set of parameters/values corresponds to the trace session in a first domain of the apparatus and the other set of parameters/values corresponds to the trace session in a second domain different from the first domain; providing means adapted to provide the selected set of parameters/values and an identifier to a tracing device for performing the trace session in the first domain, wherein the identifier is received in the activation message and related to the trace session.

11 Claims, 7 Drawing Sheets

(56) References Cited

OTHER PUBLICATIONS

3GPP TS 23.008 V11.6.0 (Dec. 2012); 3rd Generation Partnership Project; Technical Specification Group Core Network and Terminals; Organization of subscriber data (Release 11).
3GPP TS 29.272 V11.5.0 (Dec. 2012); 3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 11).
3GPP TS 29.274 V11.5.0 (Dec. 2012); 3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 11).
3GPP TS 32.422 V11.6.0 (Dec. 2012); 3rd Generation Partnership Project; Technical Specification Group Services and System Aspects; Telecommunication management; Subscriber and equipment trace; Trace control and configuration management (Release 11).
3GPP TS 37.320 V11.1.0 (Sep. 2012); 3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 11).
International Search Report dated Sep. 18, 2013 corresponding to International Patent Application No. PCT/EP2013/050116.
3GPP TS 32.421 V11.5.0 (Dec. 2012), Technical Specification, 3rd Generation Partnership Project; Technical Specification Group Services and System Aspects; Telecommunication management; Subscriber and equipment trace; Trace concepts and requirements (Release 11), Dec. 20, 2012, pp. 1-37, XP050691382.
European Office Action corresponding to Appln. No. 13 700 131.9, dated Oct. 4, 2017.
European Office Action corresponding to Appln. No. 13 700 131.9, dated Feb. 24, 2017.
Ericsson: "Introduction MDT collection period attribute for UMTS and LTE in Trace IRP", 3GPP TSG-SA5 Meeting #86, New Orleans, USA Nov. 12-16, 2012, S5-123059, XP050689751.
European Office Action corresponding to Appln. No. 13 700 131.9, dated Jun. 11, 2018.

* cited by examiner

TRACING INTER-RAT EVENTS

FIELD OF THE INVENTION

The present invention relates to an apparatus, a method, a system, and a computer program product related to tracing and MDT. More particularly, the present invention relates to an apparatus, a method, a system, and a computer program product for tracing inter-RAT events.

BACKGROUND OF THE INVENTION

ABBREVIATIONS

3GPP: 3$^{rd}$ Generation Partnership Project
3GPP TS: 3GPP Technical Specification
EPC: Evolved Packet Core
EPS: Enhanced Packet System
E-UTRAN: Evolved Universal Terrestrial Radio Access Network
GGSN: Gateway GPRS Support Node
GPRS: General Packet Radio Service
GSM: Global System for Mobile Communication
GW: Gateway
HLR: Home Location Register
HSS: Home Subscriber Server
ID: Identifier
IMEI(SV): International Mobile Equipment Identity Software Version
IMS: IP Multimedia Subsystem
IMSI: International Mobile Subscriber Identity
IP: Internet Protocol
LTE: Long Term Evolution
MCC: Mobile Country Code
MDT: Minimization of Drive Tests
MME: Mobility Management Entity
MNC: Mobile Network Code
PDN: Packet Data Network
PLMN: Public Land Mobile Network
PS: Packet Switched
RAT: Radio Access Type
RAU: Routing Area Update
RNC: Radio Network Controller
SAE: Service Architecture Evolution
SGSN: Serving GPRS Support Node
SGW: Serving Gateway
TRS: Trace Recording Session
TRSR: Trace Recording Session Reference
TS: Trace Session
UE: User Equipment
UTRAN: Universal Terrestrial Radio Access Network
WiFi: Wireless Fidelity System Level Trace is a network system level feature which allows collecting and reporting the activities of subscribers or mobile equipment. It is a maintenance aid and development tool that is useful for customer administration and network management. It can be used to test network integrity, to check radio coverage on a particular area, to check the quality of service as perceived by the customers, to solve system malfunction or to prove that the system works properly, for example, in connection with a customer complaint or if equipment malfunction is suspected.

The feature is standardized in 3GPP as Subscriber and Equipment Trace and affects circuit and packet switched network, radio network and IMS.

Trace is activated in the network element by the Element Manager or by the Network Manager using e.g. the TraceIRP functionality and Trace Reports are sent to the Trace Collection Entity. Activating Trace in a network element means starting a so called Trace Session.

Trace can be activated in two different ways: through Management Based Activation and through Signalling Based Activation. In Management Based Activation, a Trace is activated directly in a certain network element and this network element does not forward Trace parameters to other network elements. In Signalling Based Activation, a Trace is activated directly in a certain network element or centrally and this network element may forward Trace parameters to other network elements to initiate there a Trace Session that uses the same Trace Reference.

A Trace Session is always associated to so called Trace Control and Configuration Parameters. Those may include:
  List of NE Types (The list of network elements to which to propagate Trace parameters (signalling based activation only))
  List of Interfaces (The list of interfaces to trace)
  Triggering Events (The triggering events for a Trace Recording Session (that is, for starting and stopping recording data to be included in Trace Reports))
  Trace Depth (The wished level of contents in Trace reports)
In addition a Trace Session is always associated to
  Trace Reference, a globally unique ID for the Trace Session
  IMSI or IMEI(SV) "Globally unique" means unique within the network where the trace is to be performed. In general, it may comprise a part of a larger network or the whole network. For example, the trace reference may comprise MCC and MNC, such that it is globally unique in the literal sense.

For each different network element, different events are traced and included in the Trace Reports. For example, in the MME the following events can be reported: Attach, Tracking Area Update, Detach, Service Request, Handover, Bearer Activation, Bearer Modification, Bearer Deactivation.

In addition to the Trace feature, MDT (Minimization of Drive Test) is utilizing the Trace mechanism for activating the function and for collecting the data. MDT is used to collect information from User Equipments and/or the network, wherein the information is collected per User Equipment. Thus, a Network Operator can collect statistics for different optimization purposes by utilizing user equipments in his network. Further details are described in 3GPP TS 37.320.

Tracing inter-RAT events may be very important. For example, such events might be quite common in the early phases of LTE network life.

Conventionally, an operator may activate Trace through signalling from the HSS with two different Trace References, one used for the EPC domain and one used for the PS domain. However, whereas inter RAT events can be traced in the source node, they cannot be traced in the target node since the contact between the target node and the HSS (which contains the Trace Control and Configuration parameters) is done when the inter RAT procedure is almost over. Also, post processing takes more effort than it would be necessary by using a single Trace Reference.

Also, it is possible to trace inter-RAT mobility events in both source and target nodes by assuming that the Trace Session is already activated in the target network element. So, in practice, it is necessary to activate Trace locally in all the 2G/3G/LTE network elements of the PLMN (with potentially huge waste of resources) and then the network element where the UE is registered is able to send Trace Reports containing inter RAT events (if Triggering Events=Handover or ALL). However, local Trace activation is not really feasible for big networks including multiple MMEs and SGSNs. In such networks centralized HSS based activation is requested as a feasible way.

Further details about tracing are described in 3GPP TS 32.422 "Subscriber and equipment trace; Trace control and configuration management".

SUMMARY OF THE INVENTION

It is an object of the present invention to improve the prior art. In detail, it is an object to improve the activation of tracing for inter-RAT events and for subscribers/terminals being connected successively to different RATs.

According to a first aspect of the invention, there is provided an apparatus, comprising providing means adapted to provide a first activating message, wherein the first activating message comprises an identifier of a trace session and a first set of parameters/values related to the trace session in a first domain and a second set of parameters/values related to the trace session in a second domain different from the first domain.

In the apparatus, the first domain may be a universal mobile telecommunication service and the second domain may be a long term evolution network.

In the apparatus, each of the first and second sets of parameters/values may comprise at least one of a list of NE types, a list of triggering events, a list of interfaces, and a trace depth, wherein each of the comprised lists comprises one or more entries.

In the apparatus, each of the first and second sets of parameters/values may comprise at least one of a list of measurements, a list of trigger, a list of event thresholds, and a list of measurement periods, wherein each of the comprised lists comprises one or more entries.

The apparatus may be adapted to receive the identifier, the first set of parameters/values, and the second set of parameters/values in a prior activation message received before providing the first activation message.

According to a second aspect of the invention, there is provided an apparatus, comprising providing processor adapted to provide a first activating message, wherein the first activating message comprises an identifier of a trace session and a first set of parameters/values related to the trace session in a first domain and a second set of parameters/values related to the trace session in a second domain different from the first domain.

In the apparatus, the first domain may be a universal mobile telecommunication service and the second domain may be a long term evolution network.

In the apparatus, each of the first and second sets of parameters/values may comprise at least one of a list of NE types, a list of triggering events, a list of interfaces, and a trace depth, wherein each of the comprised lists comprises one or more entries.

In the apparatus, each of the first and second sets of parameters/values may comprise at least one of a list of measurements, a list of trigger, a list of event thresholds, and a list of measurement periods, wherein each of the comprised lists comprises one or more entries.

The apparatus may be adapted to receive the identifier, the first set of parameters/values, and the second set of parameters/values in a prior activation message received before providing the first activation message.

According to a third aspect of the invention, there is provided at least one of a home subscriber server, a serving support node for a general packet radio service, and a mobility management entity for a long term evolution network, each comprising an apparatus according to any of the first and second aspects.

According to a fourth aspect of the invention, there is provided an apparatus, comprising selecting means adapted to select one set of parameters/values out of a first set of parameters/values and a second set of parameters/values received in an activation message related to a trace session of a subscriber or a terminal, wherein the selected set of parameters/values corresponds to the trace session in a first domain of the apparatus and the other set of parameters/values corresponds to the trace session in a second domain different from the first domain; providing means adapted to provide the selected set of parameters/values and an identifier to a tracing device for performing the trace session in the first domain, wherein the identifier is received in the activation message and related to the trace session.

In the apparatus, one of the first and second domains may be a universal mobile telecommunication service and the other of the first and second domains may be a long term evolution network.

In the apparatus, each of the first and second sets of parameters/values may comprise at least one of a list of NE types, a list of triggering events, a trace depth and a list of interfaces, wherein each of the comprised lists comprises one or more entries.

In the apparatus, each of the first and second sets of parameters/values may comprise at least one of a list of measurements, a list of trigger, a list of event thresholds, and a list of measurement periods, wherein each of the comprised lists comprises one or more entries.

In the apparatus, the trace session may be related to a subscriber or a terminal, and the apparatus may further comprise detecting means adapted to detect an event of the respective one of a user equipment of the subscriber and the terminal, wherein the event involves the first domain and the second domain; providing means adapted to provide, if the event is detected, the identifier and the first set of parameters/values and the second set of parameters/values to a network device of the second domain.

In the apparatus, the event may comprise at least one of a handover, a routing area update, and a tracking area update.

According to a fifth aspect of the invention, there is provided an apparatus, comprising selecting processor adapted to select one set of parameters/values out of a first set of parameters/values and a second set of parameters/values received in an activation message related to a trace session of a subscriber or a terminal, wherein the selected set of parameters/values corresponds to the trace session in a first domain of the apparatus and the other set of parameters/values corresponds to the trace session in a second domain different from the first domain; providing processor adapted to provide the selected set of parameters/values and an identifier to a tracing device for performing the trace session in the first domain, wherein the identifier is received in the activation message and related to the trace session.

In the apparatus, one of the first and second domains may be a universal mobile telecommunication service and the other of the first and second domains may be a long term evolution network.

In the apparatus, each of the first and second sets of parameters/values may comprise at least one of a list of NE types, a list of triggering events, a trace depth and a list of interfaces, wherein each of the comprised lists comprises one or more entries.

In the apparatus, each of the first and second sets of parameters/values may comprise at least one of a list of measurements, a list of trigger, a list of event thresholds, and a list of measurement periods, wherein each of the comprised lists comprises one or more entries.

In the apparatus, the trace session may be related to a subscriber or a terminal, and the apparatus may further comprise detecting processor adapted to detect an event of the respective one of a user equipment of the subscriber and the terminal, wherein the event involves the first domain and the second domain; providing processor adapted to provide, if the event is detected, the identifier and the first set of parameters/values and the second set of parameters/values to a network device of the second domain.

In the apparatus, the event may comprise at least one of a handover, a routing area update, and a tracking area update.

According to a sixth aspect of the invention, there is provided at least one of a serving support node for a general packet radio service and a mobility management entity for a long term evolution network, each comprising an apparatus according to any of the fourth and fifth aspects.

According to a seventh aspect of the invention, there is provided a system, comprising an activation apparatus according to any of the first to third aspects; and a serving apparatus according to any of fourth to sixth aspects; wherein the activation message received by the serving apparatus comprises the first activation message provided by the activation apparatus.

According to an eighth aspect of the invention, there is provided a method, comprising providing a first activating message, wherein the first activating message comprises an identifier of a trace session and a first set of parameters/values related to the trace session in a first domain and a second set of parameters/values related to the trace session in a second domain different from the first domain.

In the method, the first domain may be a universal mobile telecommunication service and the second domain may be a long term evolution network.

In the method, each of the first and second sets of parameters/values may comprise at least one of a list of NE types, a list of triggering events, a list of interfaces, and a trace depth, wherein each of the comprised lists comprises one or more entries.

In the method, each of the first and second sets of parameters/values may comprise at least one of a list of measurements, a list of trigger, a list of event thresholds, and a list of measurement periods, wherein each of the comprised lists comprises one or more entries.

The method may be adapted to receive the identifier, the first set of parameters/values, and the second set of parameters/values in a prior activation message received before providing the first activation message.

According to a ninth aspect of the invention, there is provided a method, comprising selecting one set of parameters/values out of a first set of parameters/values and a second set of parameters/values received in an activation message related to a trace session of a subscriber or a terminal, wherein the selected set of parameters/values corresponds to the trace session in a first domain of an apparatus performing the method and the other set of parameters/values corresponds to the trace session in a second domain different from the first domain; providing the selected set of parameters/values and an identifier to a tracing device for performing the trace session in the first domain, wherein the identifier is received in the activation message and related to the trace session.

In the method, one of the first and second domains may be a universal mobile telecommunication service and the other of the first and second domains may be a long term evolution network.

In the method, each of the first and second sets of parameters/values may comprise at least one of a list of NE types, a list of triggering events, a trace depth and a list of interfaces, wherein each of the comprised lists comprises one or more entries.

In the method, each of the first and second sets of parameters/values may comprise at least one of a list of measurements, a list of trigger, a list of event thresholds, and a list of measurement periods, wherein each of the comprised lists comprises one or more entries.

In the method, the trace session may be related to a subscriber or a terminal, and the method may further comprise detecting an event of the respective one of a user equipment of the subscriber and the terminal, wherein the event involves the first domain and the second domain; providing, if the event is detected, the identifier and the first set of parameters/values and the second set of parameters/values to a network device of the second domain.

In the method, the event may comprise at least one of a handover, a routing area update, and a tracking area update.

Each of the methods according to the eighth and ninth aspects may be a method of Tracing Inter-RAT events.

According to a tenth aspect of the invention, there is provided a computer program product comprising a set of instructions which, when executed on an apparatus, is configured to cause the apparatus to carry out the method according to any one of the eighth and ninth aspects. The computer program product may be embodied as a computer-readable medium.

According to embodiments of the invention, at least one of the following advantages may be achieved:

Inter-RAT events may be traced without involving a huge amount of resources.

A subscriber or a terminal may be traced continuously in different RATs.

The post-processing of the traces of subscribers/terminals connected to different RATs one after the other is simplified and requires less effort.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred embodiments of the present invention which is to be taken in conjunction with the appended drawings, wherein.

DETAILED DESCRIPTION OF CERTAIN EMBODIMENTS

Figure 1A:
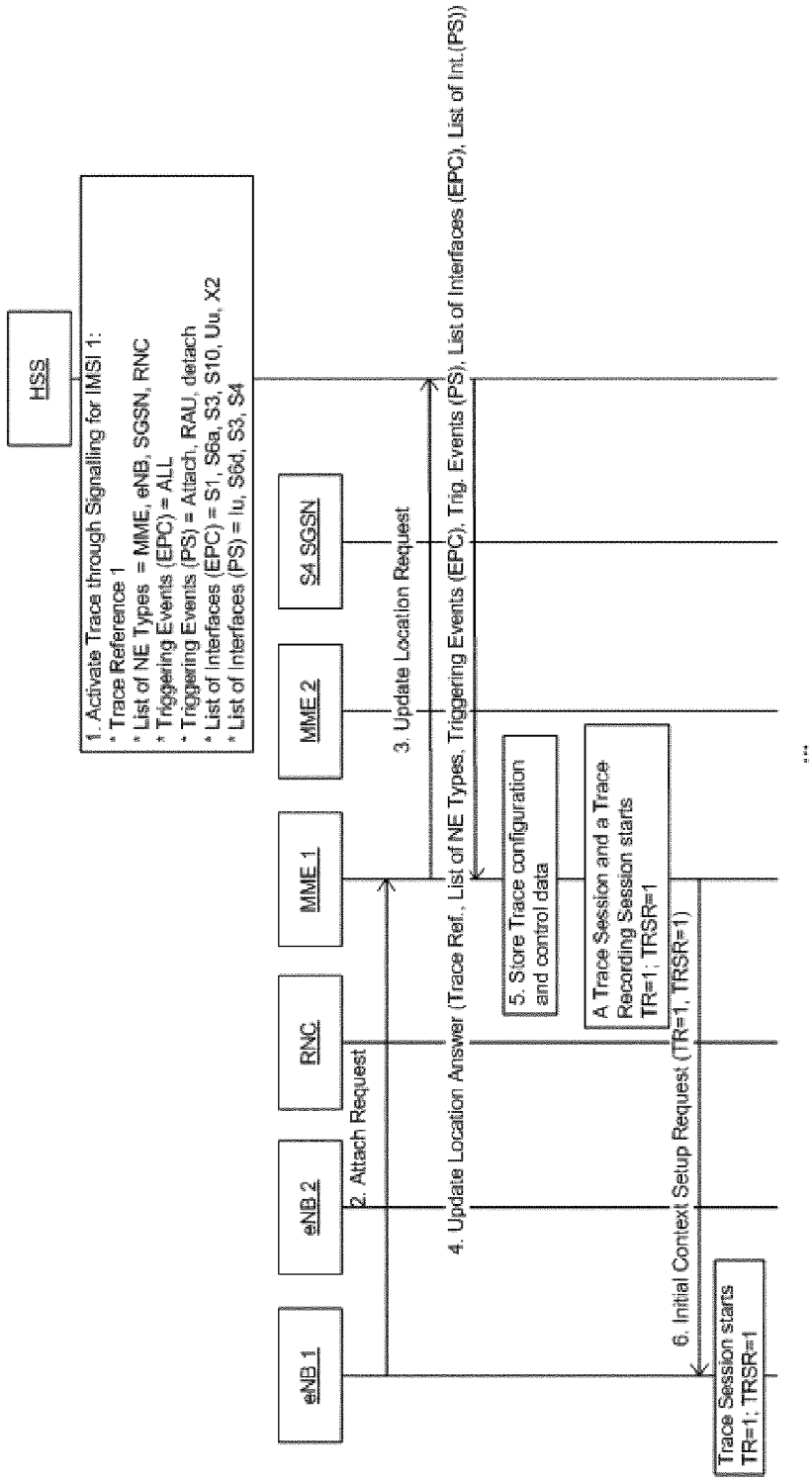
FIG. 1a-c shows a message flow of a subscription based trace activation according to an embodiment of the invention.

Herein below, certain embodiments of the present invention are described in detail with reference to the accompanying drawings, wherein the features of the embodiments can be freely combined with each other unless otherwise described. However, it is to be expressly understood that the description of certain embodiments is given for by way of example only, and that it is by no way intended to be understood as limiting the invention to the disclosed details.

Moreover, it is to be understood that the apparatus is configured to perform the corresponding method, although in some cases only the apparatus or only the method are described.

In case subscriber/equipment specific trace is configured in HSS, trace data of inter-rat mobility events are lost in the target network element according to the prior art.

Conventional methods to trace inter-RAT mobility events in both source and target nodes are not practical since they involve huge waste of network resources. However, using efficiently network resources is a high priority item for telecom operators. For signalling based MDT, inter-RAT support is limited in the same way as for the trace feature.

According to embodiments of the invention a trace control and configuration parameters structure is defined which includes—related to a single Trace Reference—all the parameters needed for two or more different domains (RATs). This (or a corresponding) data structure may be transferred from a subscriber register such as HSS or HLR to the respective control nodes (e.g. SGSN and MME for PS and EPC, respectively) and between those control nodes.

By using Signalling Based Trace Activation or Signalling based MDT, the HSS/HLR activates Trace/MDT in the source network element (MME or S4 SGSN/SGSN) depending on whether the UE is in the EPC or in the PS domain. Here, S4 SGSN means a SGSN being connected by a S4 interface to a Serving SAE gateway of the LTE RAT.

According to embodiments of the invention, Trace Control and Configuration parameters and/or MDT parameters contained in the HSS/HLR have a structure that allows tracing a subscriber/UE in multiple (two or more) domains by using one single Trace Session. Namely, one Trace Reference maps to multiple instances of the Triggering Events parameter, and/or to multiple instances of List of Interfaces parameter and may contain also the MDT parameters that are specific for each domain (e.g. UMTS and LTE). Multiple instances are required because Triggering Events and/or List of Interfaces parameter have different value in different domains. Accordingly, the number of instances is equal to or less than the number of domains where the tracing shall take place. Less instances than domains may be required if some lists may be identical for some of the domains. Also in case of MDT, there are some domain specific parameters such as UMTS specific parameter and LTE specific parameters.

Alternatively, according to embodiments of the invention, one Trace Reference maps to single instances of the Triggering Events parameter, and/or to single instances of List of Interfaces parameter and may contain also the MDT parameters that are specific for each domain (e.g. UMTS and LTE). In this case, each instance comprises plural values of the respective parameters for each domain. The number of values may be equal to or less than the number of domains where the tracing shall take place. Less values than domains may be required if some values are identical for some of the domains.

For example, the list of interfaces may have seven bytes, four for the LTE domain (MME, eNB, SGW and PDN GW), and three for the UMTS domain (SGSN, GGSN, and RNC).

In some embodiments of the invention, one Trace reference may map to single instances with plural values of one or two of the triggering event parameters, List of Interface parameters, and trace depth, and to multiple instances of the other parameters. Hereinafter, any combination of plural instances with single values and single instances with plural values will be referred to as parameters/values.

In the following, as an example, tracing in two domains (UMTS with PS domain and LTE with EPC domain) is further exemplified. The same procedures and data structures may be applied correspondingly to more than two domains.

When the Trace Session is activated in the MME/S4 SGSN/SGSN, the HSS/HLR may send parameters related to both the EPC and the PS domain to the MME/S4 SGSN/SGSN through S6a/S6d/Gr interface.

When receiving the Trace/MDT activation from the HSS/HLR through S6a/S6d/Gr interface, the MME/S4 SGSN/SGSN stores both the parameters related to its own domain and the parameters related to the other domain.

Whenever there is an inter MME mobility management event (e.g. S1 based handover or Tracking Area Update), the source MME sends parameters related to both the EPC and the PS domain to the target MME through S10 interface.

Similarly, in an inter S4 SGSN/SGSN mobility management event (e.g. Inter SGSN Routeing Area Update, Serving SRNS Relocation Procedure, Hard Handover), the source S4 SGSN/SGSN sends parameters related to both the EPC and the PS domain to the target S4 SGSN/SGSN through S3/Gn interface.

Whenever there is an inter RAT mobility management event, the source node sends the Trace control and configuration parameters/MDT parameters to the target node through S3/Gn interface, containing the parameters related to both the EPC and the PS domain.

This allows activating Subscriber and Equipment Trace Sessions or MDT Trace Sessions in the MME and in the (S4) SGSN through S3/Gn interface and therefore it allows tracing users that migrate to other RATs without having to activate Trace locally to all MMEs and (S4) SGSNs. Thus, resources in the network are saved. This method allows to trace inter RAT events both in the source and in the target node. In case of MDT this allows to have MDT data collected in both UMTS and LTE with one Trace Session and allows to have MDT data collected, e.g. Radio signal strength and quality data in case of an inter-RAT mobility event for a signalling based MDT.

The reason for transferring the parameters related to both domains between the nodes is that, for example in the E-UTRAN to UTRAN Iu mode Inter RAT handover, the S4 SGSN needs SGSN Trace Control and Configuration Parameters/UMTS specific MDT parameters to start the Trace Session/MDT Trace Session. However, the S4 SGSN needs also to receive and store the MME Trace Control and Configuration Parameters/LTE specific MDT parameters in order to be able to forward them to a MME through S3 interface in case of UTRAN to E-UTRAN Iu mode Inter RAT handover.

According to some embodiments of the invention, the following aspects are implemented:

A method to Trace UEs/Collect MDT data in multiple domains by using one single Trace Session.

A method to trace Inter-RAT events in both source and target node.

A structure of Trace Control and Configuration parameters in the HSS that allows to implement the above mentioned method (In particular, one Trace Reference may map to two instances of the Triggering Events parameter and/or to two instances of List of Interfaces parameter. Alternatively, one Trace Reference may map to Triggering Events parameter, List of Interfaces parameter, and List of Network Element types parameter that contain values related to multiple domains. Also, a mixture of plural instances for some parameters and a single instance with plural values for other parameters may be implemented. In addition, the same Trace Reference may map also to the LTE and UMTS specific MDT parameters.).

The Trace Control and Configuration parameters/values with the above mentioned structure may be propagated to the relevant network elements within a single domain (both EPC domain and PS domain related Trace parameters/values and both UMTS and LTE specific MDT parameters/values may be sent e.g. through S6a/S6d/Gr/S10/Gn/S3 interfaces).

It is ensured that the Trace Control and Configuration parameters/values are available in a network element when needed (namely, by storing both the parameters/values related to its own domain and the parameters/values related to the other domain(s)).

Tracing of users/terminals that migrate to other RATs is enabled in both the source and the target node without having to activate Trace/MDT locally to all the network elements, therefore not wasting network resources (by propagating Trace control and configuration parameters/values/MDT parameters/values to the other domain e.g. through S3/Gn interface by including the parameters/values related to both the source and the target domain and potentially further domains).

Figure 1B:
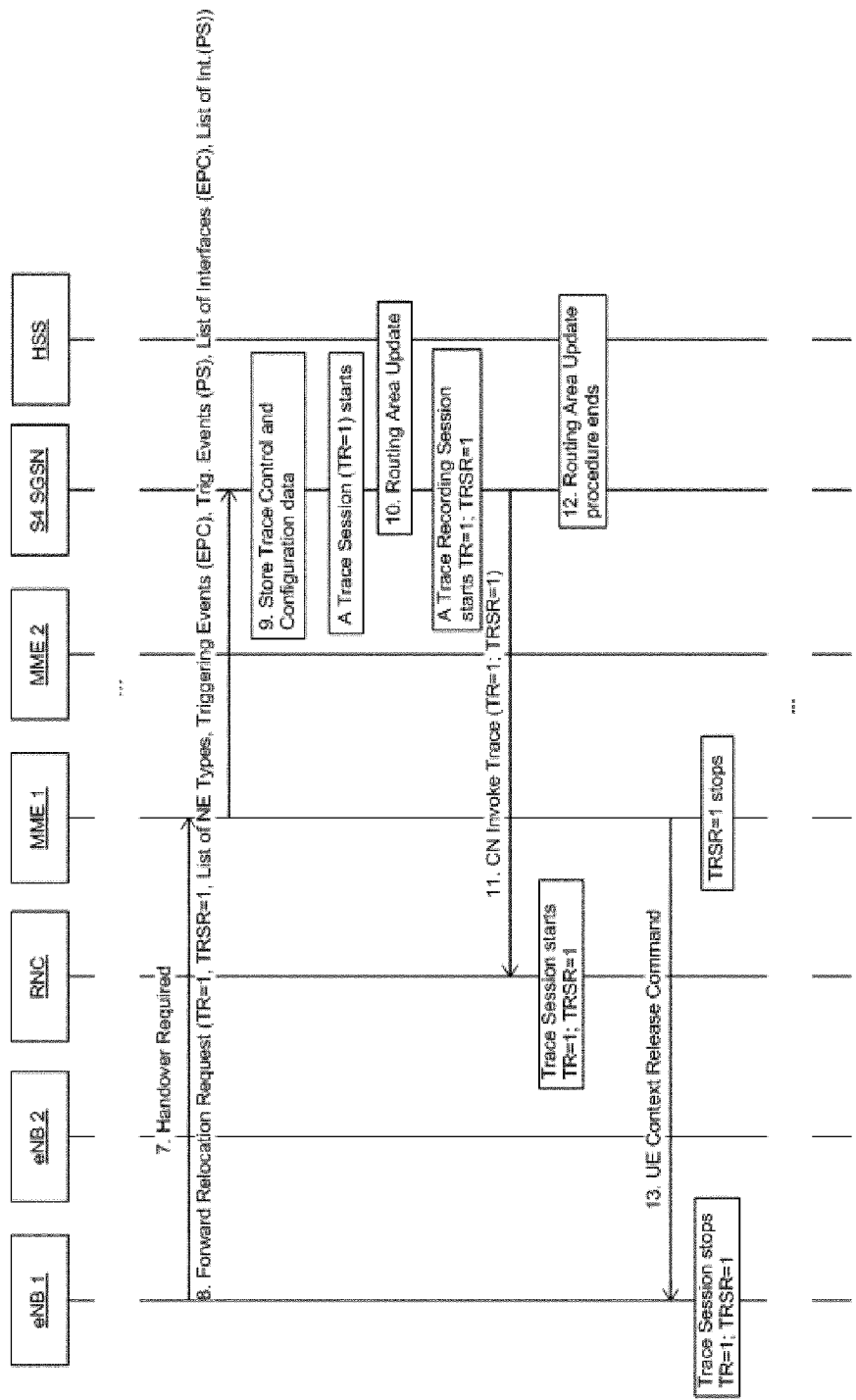
Figure 1C:
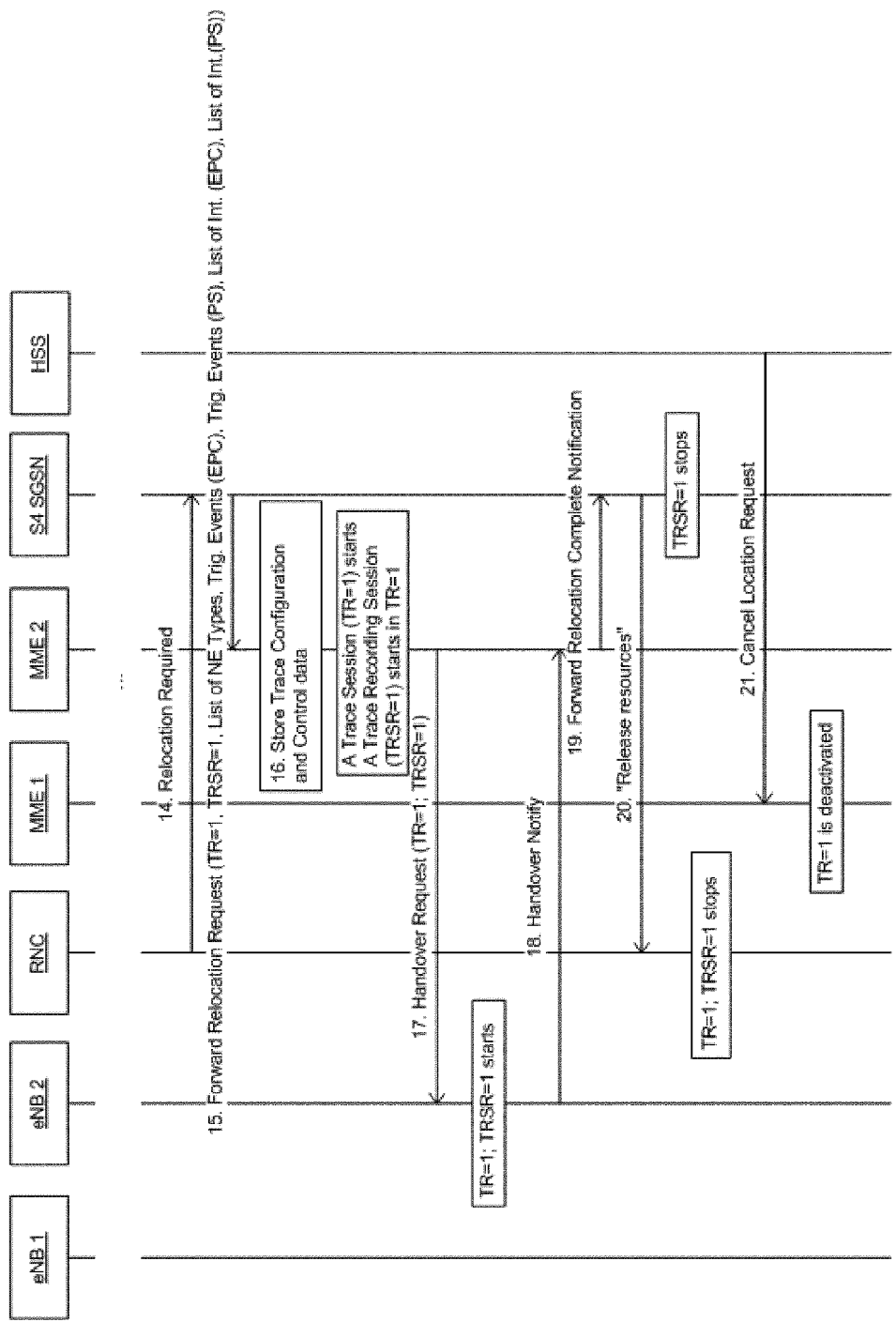

FIG. 1 shows a message flow according to an embodiment of the invention. For better readability, the message flow is split into three parts (FIGS. 1a to 1c), which are to be considered as a single message flow. It is shown a message flow of a Subscriber Trace activated in HSS, wherein UE attaches to EPC, then moves to PS domain (handover) and then handovers back to EPC. Subscriber Trace is used to show the message sequence. Only the messages and information element that are relevant to understand the embodiment of the invention are shown in the figure. This figure is specific for tracing and does not show all the possible configuration options for tracing, it is just an example scenario.

(1.) A Trace Session is activated in the HSS for both the EPS and the PS domain. Two set of Triggering Events and List of Interfaces parameters are provided for Trace Reference 1, one for each domain.

(2.) The UE attaches in the EPS to MME1 and eNB1. After Update Location request from MME1 to HSS (3.), (4.) MME1 receives from the HSS the Trace parameters/values of Triggering Events and List of Interfaces parameters/values for Trace Reference 1, one for each domain.

(5./6.) MME1 stores Trace control and configuration data and uses the EPS related parameters to start a Trace Recording Session in the MME and in the eNB1. In the example of FIG. 1, triggering Events for EPS domain is ALL so the Trace Recording Session will stay on as long as there is a S1 connection.

(7.) MME1 receives a Handover Required and (8.) sends a Forward Relocation Request to the S4 SGSN containing Trace Reference and two instances of Triggering Events and List of Interfaces parameters. In addition, it contains TRSR=1 which is the last used Trace Recording Session Reference.

(9.) The SGSN stores Trace control and configuration data and a Trace Session starts in the SGSN with the same Trace Reference that is used in the MME1.

(10.) RAU is among the Triggering Events for PS so, during the Routing Area Update that follows the E-UTRAN to UTRAN Iu mode Inter RAT handover, a Trace Recording Session is started in the SGSN and in the RNC (11.). TRSR of the TRS is 1, too.

(12.) When the RAU procedure ends in the SGSN, the Trace Recording Session stops.

(13.) When at the end of the E-UTRAN to UTRAN Iu mode Inter RAT handover procedure the MME cleans up the resources in the eNB1, the Trace Recording Session (TRSR=1) stops in the MME1 and in the eNB1.

(14.) The UE moves again, the SGSN gets the Relocation Required and (15.) sends a Forward relocation Request to the MME2 containing Trace Reference TSR=1, the last used recording session TRSR=1, and two instances or one instance with two values of Triggering Events and List of Interfaces parameters. MME2 stores Trace control and configuration data and start a Trace Recording Session (TRSR=1) with the same Trace Reference that is used in the SGSN (TR=1). (16.) Also, a Trace Recording Session starts in eNB2 with TRSR=1 (17.).

(18.) eNB2 sends Handover Notify to MME2 (19.) which sends Forward Relocation Complete Notification to the SGSN.

(20.) When MME2 release resources in the RNC, the Trace Recording Session (TR=1, TRSR=1) stops in the RNC.

(21.) During the Tracking Area Update that follows the UTRAN Iu mode to E-UTRAN Inter RAT handover procedure, the HSS sends Cancel Location Request to MME1 and this deactivates the Trace Session (TR=1) from MME1.

In the example message flow shown in FIG. 1, TR and TRSR are always the same. TRSR would be different in the core network (MME, SGSN) for the next call/session establishment of the UE. Also, typically, in the radio network in RNC/eNB, TRSR and TR are always the same.

Figure 2A:
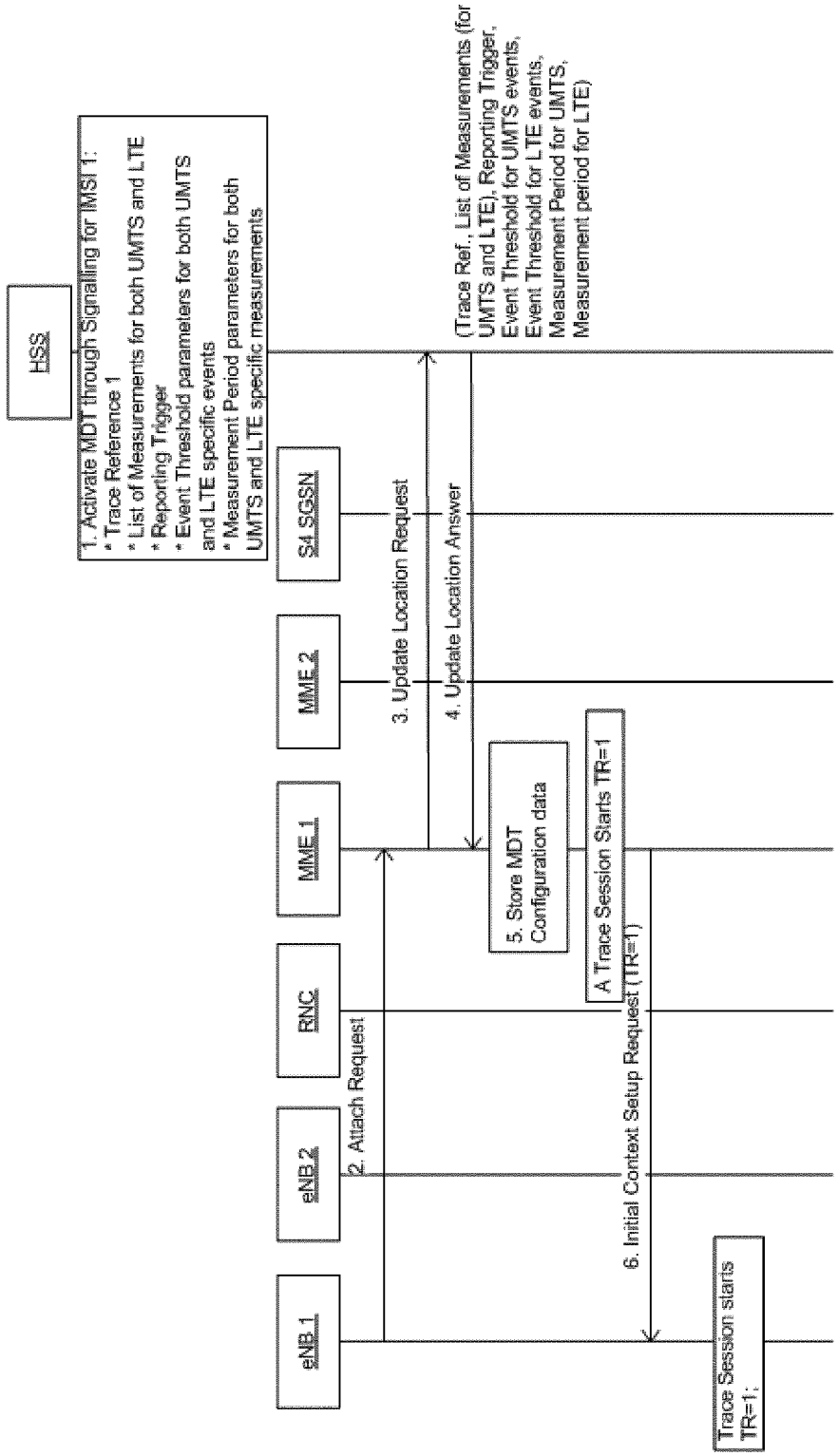
FIG. 2a-c shows that a message flow of a subscription based MDT activation according to an embodiment of the invention.
Figure 2B:
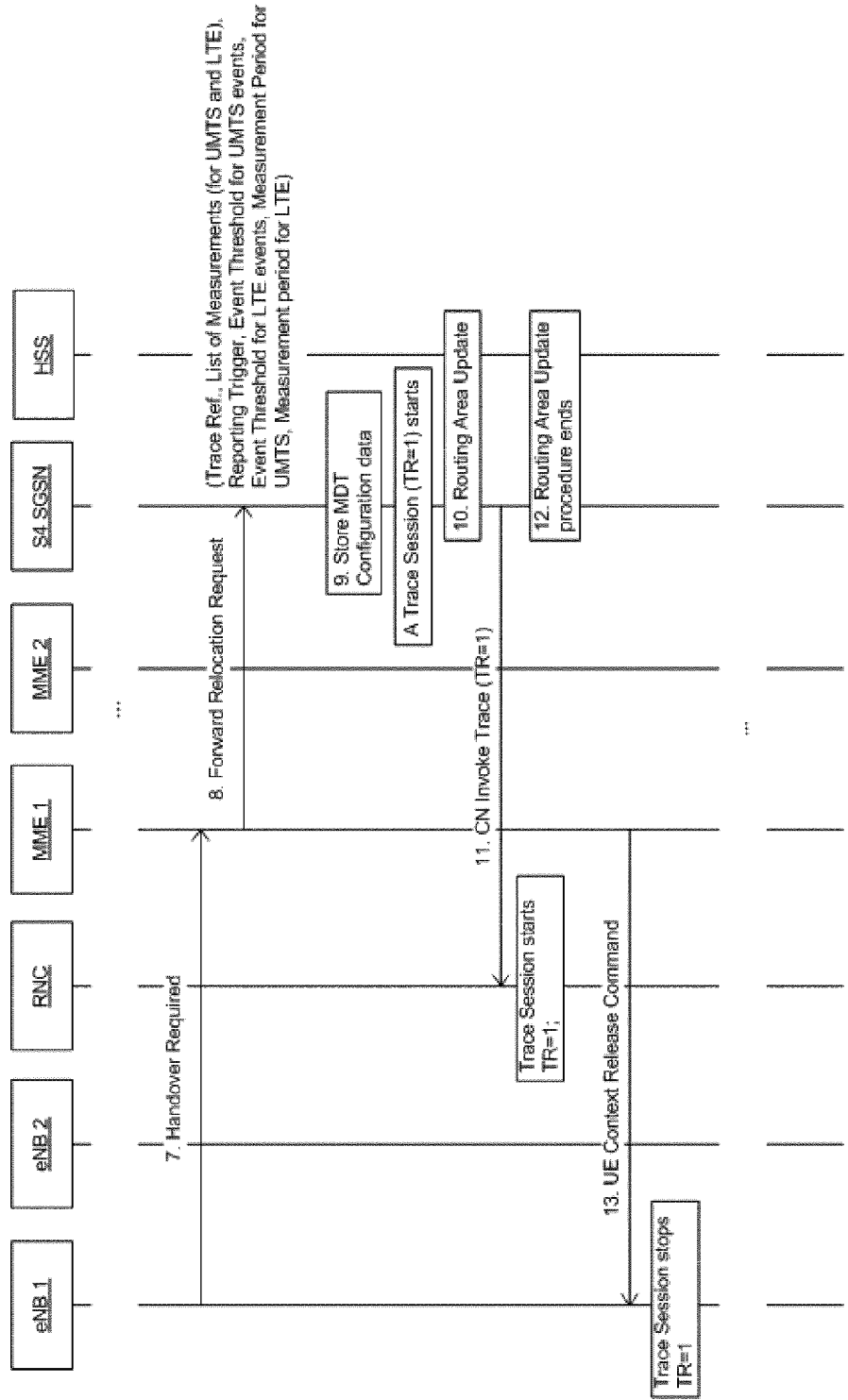
Figure 2C:
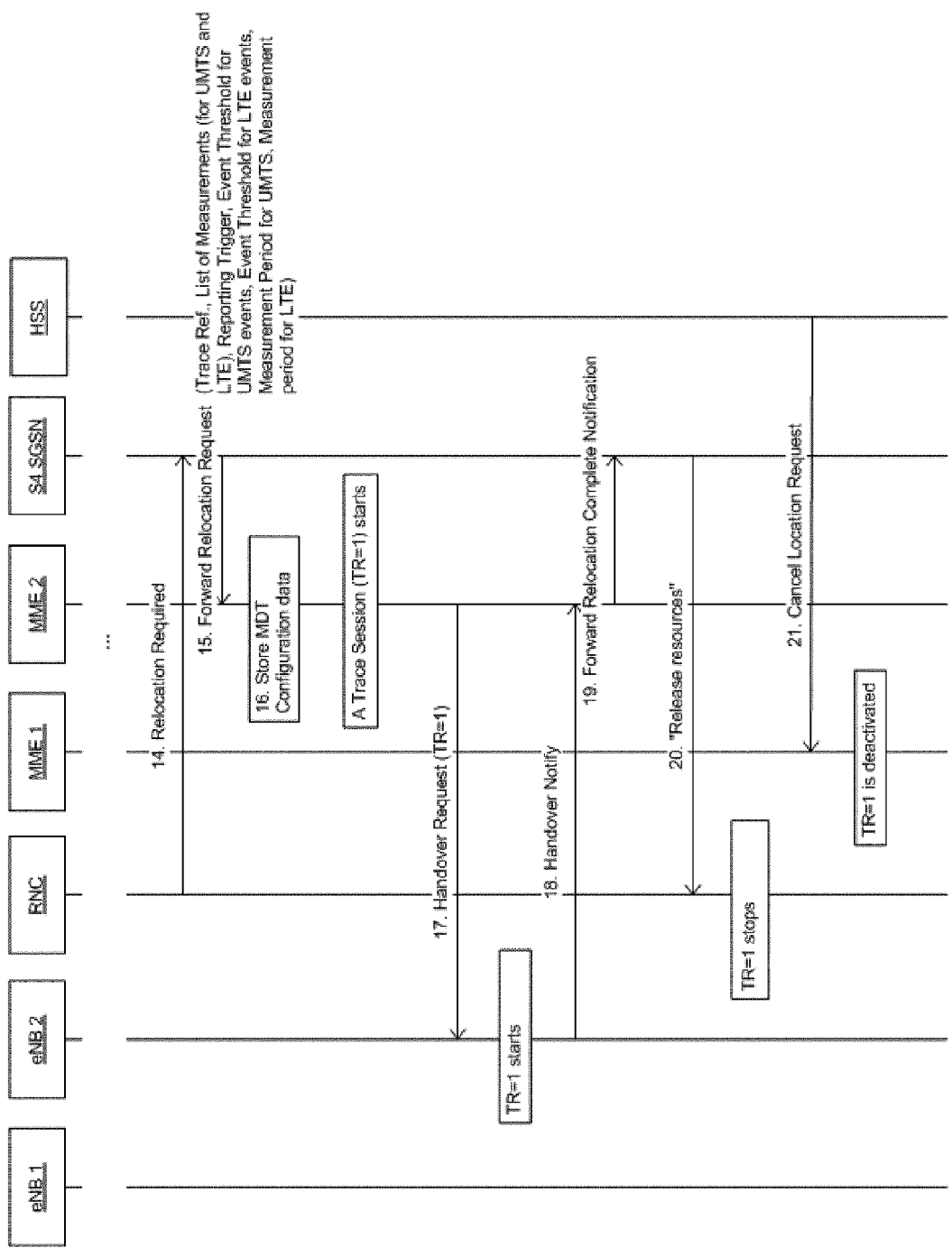

FIG. 2 shows a message flow according to an embodiment of the invention. For better readability, the message flow is split into three parts (FIGS. 2a to 2c), which are to be considered as a single message flow. It is shown a message flow of Subscription based MDT activated in HSS, wherein UE attaches to EPC, then moved to PS domain (handover) and then handovers back to EPC. Only the messages and information element that are needed to understand the embodiment of the invention are shown in the figure. This figure is specific for MDT and does not show all the possible configuration options for an MDT, it is just an example scenario.

(1.) A Trace Session is activated in the HSS for both the EPS and the PS domain. Both UMTS and LTE specific MDT parameters for Trace Reference TSR=1 are added. This means that HSS shall store the measurement period parameters for both UMTS and LTE measurements and shall store the event threshold parameters for both UMTS and LTE specific events.

(2.) The UE attaches in the EPS to MME1 and eNB1. After Update Location request from MME1 to HSS (3.), (4.) MME1 receives from the HSS the MDT parameters containing both the UMTS and LTE specific MDT parameters.

(5./6.) MME1 stores the MDT parameters and activates the Trace Session (TR=1) with the LTE specific MDT parameters to the eNB.

(7.) MME1 receives a Handover Required and (8.) sends a Forward Relocation Request to the S4 SGSN containing Trace Reference and the UMTS and LTE specific MDT parameters.

(9.) The SGSN stores the MDT parameters and a Trace Session starts in the SGSN with the same Trace Reference TR=1 that is used in the MME1.

(10.) A Routing Area Update follows the E-UTRAN to UTRAN Iu mode Inter RAT handover procedure and (11.) a Trace Session (TR=1) is activated in the RNC with the UMTS specific MDT data.

(13.) When at the end of the E-UTRAN to UTRAN Iu mode Inter RAT handover procedure the MME cleans up the resources in the eNB1, the Trace Session (TR=1) stops in the eNB1.

(14.) The UE moves again, the SGSN gets the Relocation Required and (15.) sends a Forward Relocation Request to the MME2 containing Trace Reference and both UMTS and LTE specific MDT parameters. MME2 stores the MDT parameters (16.).

(17.) MME2 activates Trace Session (TR=1) with the LTE specific MDT parameters to the eNB2 with the Handover Request message.

(18.) eNB2 sends Handover Notify to MME2 (19.) which sends Forward Relocation Complete Notification to the SGSN.

(20.) When MME2 release resources in the RNC, the Trace Session (TR=1) stops in the RNC.

(21.) During the Tracking Area Update that follows the UTRAN Iu mode to E-UTRAN Inter RAT handover procedure, the HSS sends Cancel Location Request to MME1 and this deactivates the Trace Session (TR=1) from MME1.

Figure 4:
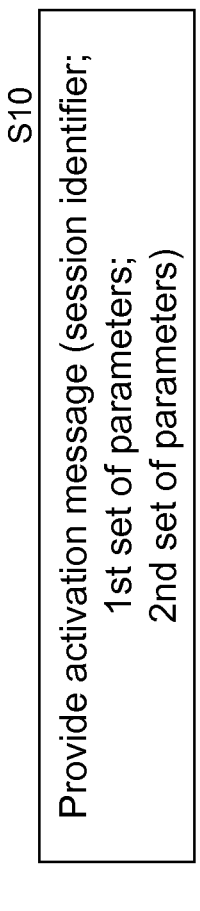
FIG. 4 shows a method according to an embodiment of the invention.
Figure 3:
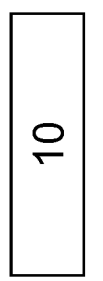
FIG. 3 shows an apparatus according to an embodiment of the invention.

FIG. 3 shows an apparatus according to an embodiment of the invention. The apparatus may be a subscriber register such as a HLR or a HSS or control node such as a MME or a SGSN or may be comprised by a subscriber register such as a HLR or a HSS or control node such as a MME or a SGSN. FIG. 4 shows a method according to an embodiment of the invention. The apparatus according to FIG. 3 may perform the method of FIG. 4 but is not limited to this method. The method of FIG. 4 may be performed by the apparatus of FIG. 3 but is not limited to being performed by this apparatus.

The apparatus comprises providing means 10.

The providing means 10 provides an activating message, wherein the activating message comprises an identifier of a trace session and a first set of parameters/values related to the trace session in a first domain and a second set of parameters/values related to the trace session in a second domain different from the first domain (S10). If the apparatus is comprised by a subscriber register, the providing means 10 provides the activating message e.g. at location update/routing area update/tracking area update, but it should not be limited to the location update/routing area update/tracking area update (LU/RAU/TAU) as it can also be provided in a standalone procedure if e.g. the UE is already registered to the network. If the apparatus is comprised by a control node, the providing means 10 provides the activating message e.g. at handover/relocation or tracking/routing area update.

Figure 6:
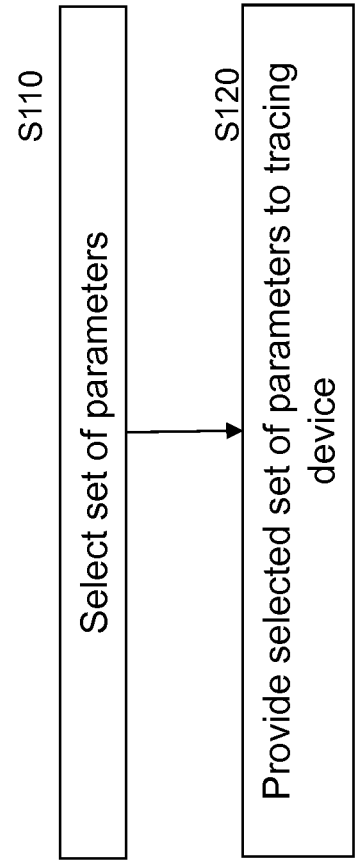
FIG. 6 shows a method according to an embodiment of the invention.
Figure 5:
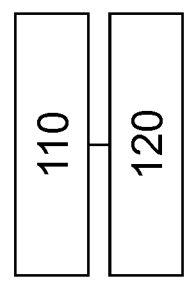
FIG. 5 shows an apparatus according to an embodiment of the invention.

FIG. 5 shows an apparatus according to an embodiment of the invention. The apparatus may be or may be comprised by a subscriber register such as a HLR or a HSS or control node such as a MME or a SGSN. FIG. 6 shows a method according to an embodiment of the invention. The apparatus according to FIG. 5 may perform the method of FIG. 6 but is not limited to this method. The method of FIG. 6 may be performed by the apparatus of FIG. 5 but is not limited to being performed by this apparatus.

The apparatus comprises selecting means 110 and providing means 120.

After having received an activation message, the selecting means 110 selects one set of parameters/values received in the activation message that corresponds to the domain of the apparatus (S110). Namely, the received activation message comprises two or more sets of parameters/values related to a trace session of a subscriber or a terminal, wherein the other (not selected) set(s) of parameters/values correspond to the trace session in domain(s) different from the domain of the apparatus. In addition, the activation comprises an identifier related to the trace session.

The providing means 120 provides the selected set of parameters/values and the identifier to a tracing device for performing the trace session in the first domain (S120).

A domain may be a radio access type. It may also be one of different core domains for the same radio access type, e.g. a circuit switched domain or a packet switched domain for UMTS radio access type.

Embodiments of the invention may not only be applied to inter-RAT handover between LTE and UMTS, but also to other kinds of inter-RAT handover such as between any two RATs of LTE, UMTS, GSM, WiFi, CDMA2000 etc.

Embodiments of the present invention may be applied to more than two domains. In such a case, the respective trace activation messages may comprise a set of parameters/values for each of the different domains. The respective serving node (e.g. MME, SGSN) may select a corresponding one of the plural sets of parameters/values.

The interfaces mentioned herein are named according to current 3GPP standards. However, embodiments of the present inventions may use other interfaces. In particular, they may use one or more interfaces designed for transmitting the trace activation message between the respective entities.

Also, the functional interfaces described herein may be based on different physical implementations. E.g., two network entities exchanging messages may be directly connected to each other or may be connected via other network elements.

If not otherwise stated or otherwise made clear from the context, the statement that two entities are different means that they are differently addressed. It does not necessarily mean that they are based on different hardware. That is, each of the entities described in the present description may be based on a different hardware, or some or all of the entities may be based on the same hardware.

According to the above description, it should thus be apparent that exemplary embodiments of the present invention provide, for example a storage means, or a component thereof, an apparatus embodying the same, a method for controlling and/or operating the same, and computer program(s) controlling and/or operating the same as well as mediums carrying such computer program(s) and forming computer program product(s). Furthermore, it should thus be apparent that exemplary embodiments of the present invention provide, for example a partitioner, or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques or methods include, as non limiting examples, implementations as hardware, software, firmware, special purpose circuits or logic, general purpose hardware or controller or other computing devices, or some combination thereof.

It is to be understood that what is described above is what is presently considered the preferred embodiments of the present invention. However, it should be noted that the description of the preferred embodiments is given by way of example only and that various modifications may be made without departing from the scope of the invention as defined by the appended claims.

The invention claimed is:

1. An apparatus, comprising:
at least one processor; and
at least one memory including computer program code,
wherein the at least one memory and the computer program code are configured to, with the at least one processor, cause the apparatus at least to:
receive an activating message, wherein the activating message comprises an identifier of a trace session, a first set of parameters related to the trace session in a first domain, and a second set of parameters related to the trace session in a second domain that is different from the first domain;
provide a forward relocation request, wherein the forward relocation request comprises the identifier of the trace session, the first set of parameters, the second set of parameters, and a trace recording session reference; and
initiate a trace session in the apparatus, wherein the trace session uses the identifier of the trace session.

2. The apparatus according to claim 1, wherein the first domain is a universal mobile telecommunication service and the second domain is a long term evolution network.

3. The apparatus according to claim 1, wherein each of the first and second sets of parameters comprises at least one of a list of NE types, a list of triggering events, a list of interfaces, and a trace depth, wherein each of the comprised lists comprises one or more entries.

4. The apparatus according to claim 1, wherein each of the first and second sets of parameters comprises at least one of a list of measurements, a list of trigger, a list of event thresholds, and a list of measurement periods, wherein each of the comprised lists comprises one or more entries.

5. The apparatus according to claim 1, adapted to receive the identifier, the first set of parameters, and the second set of parameters in a prior activation message received before providing the first activation message.

6. A method, comprising:
receiving, by a processor, an activating message, wherein the activating message comprises an identifier of a trace session, a first set of parameters related to the trace session in a first domain, and a second set of parameters related to the trace session in a second domain different from the first domain;
providing a forward relocation request, wherein the forward relocation request comprises the identifier of the trace session, the first set of parameters, the second set of parameters, and a trace recording session reference; and
initiating a trace session in the apparatus, wherein the trace session uses the identifier of the trace session.

7. The method according to claim 6, wherein the first domain is a universal mobile telecommunication service and the second domain is a long term evolution network.

8. The method according to claim 6, wherein each of the first and second sets of parameters comprises at least one of a list of NE types, a list of triggering events, a list of interfaces, and a trace depth, wherein each of the comprised lists comprises one or more entries.

9. The method according to claim 6, wherein each of the first and second sets of parameters comprises at least one of a list of measurements, a list of trigger, a list of event thresholds, and a list of measurement periods, wherein each of the comprised lists comprises one or more entries.

10. The method according to claim 6, adapted to receive the identifier, the first set of parameters, and the second set of parameters in a prior activation message received before providing the first activation message.

11. A computer program product embodied on a non-transitory computer-readable medium, said product comprising a set of instructions which, when executed on an apparatus, is configured to cause the apparatus to carry out the method according to claim 6.

* * * * *